United States Patent
Larson

Patent Number: 6,164,243
Date of Patent: Dec. 26, 2000

[54] MILKING INFLATION

[75] Inventor: Leigh R. Larson, Johnson Creek, Wis.

[73] Assignee: Avon Hi-Life, Inc., Johnson Creek, Wis.

[21] Appl. No.: 09/248,460

[22] Filed: Feb. 11, 1999

Related U.S. Application Data

[60] Provisional application No. 60/074,626, Feb. 13, 1998.

[51] Int. Cl.$^7$ .................................. A01J 5/04; A01J 5/16
[52] U.S. Cl. ..................................... 119/14.49; 119/14.52
[58] Field of Search ............................ 119/14.47, 14.48, 119/14.49, 14.5, 14.51, 14.52

[56] References Cited

U.S. PATENT DOCUMENTS

| | | | |
|---|---|---|---|
| 1,312,941 | 8/1919 | Anderson | 119/14.52 |
| 1,446,295 | 2/1923 | Hinman | 119/14.52 |
| 2,502,362 | 3/1950 | Babson et al. | 119/14.52 |
| 2,997,980 | 8/1961 | Noorlander | 119/14.52 |
| 3,659,558 | 5/1972 | Noorlander | 119/14.52 |
| 3,973,521 | 8/1976 | Duncan | 119/14.47 |
| 4,280,446 | 7/1981 | Noorlander | 119/14.49 |
| 4,315,480 | 2/1982 | Noorlander | 119/14.49 |
| 4,324,201 | 4/1982 | Larson | 119/14.51 |
| 4,352,234 | 10/1982 | Noorlander | 29/450 |
| 4,372,250 | 2/1983 | Larson | 119/14.47 |
| 4,459,938 | 7/1984 | Noorlander | 119/14.49 |
| 4,459,939 | 7/1984 | Noorlander | 119/14.49 |
| 4,604,969 | 8/1986 | Larson | 119/14.36 |
| 4,745,881 | 5/1988 | Larson | 119/14.51 |
| 4,756,275 | 7/1988 | Larson | 119/14.49 |
| 5,224,442 | 7/1993 | Davies | 119/14.49 |
| 5,572,947 | 11/1996 | Larson et al. | 119/14.51 |

FOREIGN PATENT DOCUMENTS

| | | |
|---|---|---|
| 499796 | 2/1920 | France . |
| 4419948 | 6/1995 | Germany . |

*Primary Examiner*—Michael J. Carone
*Assistant Examiner*—James S. Bergin
*Attorney, Agent, or Firm*—Rader, Fishman, Grauer & Mc Garry

[57] ABSTRACT

The suction sleeve of a milking inflation includes three axially extending side walls connected together to form a generally triangular cross section. The side walls have a convex section which bulges slightly outwardly such that, where the inflation is installed on a teat cup shell and the side walls are in a full open position, a built-in spring effect is induced into each side wall to bias them toward the full open position and such that the biasing force of this built-in spring must be overcome before the side walls can be moved inwardly toward a closed position in response to the shell chamber being exposed to atmospheric pressure and assists movement of the side walls toward an open position in response to exposing the shell chamber to a subatmospheric pressure.

8 Claims, 1 Drawing Sheet

MILKING INFLATION

This application claims the benefit of priority from U.S. provisional patent application No. 60/074,626, filed Feb. 13th, 1998.

BACKGROUND OF THE INVENTION

This invention relates to liners or inflations for teat cup assemblies for vacuum-operated automatic milking machines for milk producing animals.

Automatic milking machines employ teat cup assemblies having a hollow, rigid outer shell and a resilient, tubular liner or inflation installed in the shell in a manner to form a seal at both ends of the shell and define a chamber between the shell and the inflation.

Inflations include an upper portion or suction sleeve which fits inside the teat cup shell and a lower portion or milking tube section. In one-piece inflations, the milking tube section is formed integrally with the suction sleeve and extends from an opening in the lower end of the teat cup shell and is adapted to be connected to the nipple of a so-called claw of the milking machine. In multi-piece inflations, the suction sleeve and the milking tube section are separate parts and are connected in fluid communication with each other by a sleeve connector or the like or the milking tube section includes a cup-shaped upper end which fits over the lower end of the teat cup shell with the upper end in fluid communication with the interior of the suction sleeve.

An animal's teat is inserted into the upper end of the inflation. During the milking operation, the teat cup assembly is suspended from a teat by engagement between an opening or mouth in the upper or head end of the inflation and also with the inside surface of the suction sleeve. A vacuum maintained in the milking machine claw causes the teat orifice to dilate, allowing milk to flow from the teat, through the suction sleeve and through the milking tube section into the milker claw. The chamber between the shell and the suction sleeve is connected to a pulsator on the milking machine. The pulsator periodically opens the shell chamber to atmospheric pressure, causing the suction sleeve to collapse to a closed position. When in this closed position, the suction sleeve compresses the teat tissue and causes the teat orifice to close, interrupting flow of milk from the teat. Flow of milk from the teat resumes when the suction sleeve returns to a normally open position in response to the pulsator subsequently connecting the shell chamber to vacuum.

Desirable features for a suction sleeve include (1) an internal configuration which permits a teat cup to be slipped onto a teat far enough to minimize slippage during milking and maintain the teat cup on the teat until milking has been completed, (2) capability of providing a substantially balanced closing action on a teat while collapsing in response to the pulsator opening the shell chamber to atmospheric pressure, (3) capability of rapidly returning from a collapsed or closed position to a normally opened position in response to the pulsator connecting the shell chamber to the vacuum, thereby maximizing the milk flowing period and minimizing the total milking time, and (4) capability of withstanding extended close/open cycles without structural failures.

Suction sleeves typically have a circular inside configuration. As a teat shrinks in diameter during milking, the area of surface contact between the teat and the inside surface of suction sleeves having such a configuration can result in a decrease of frictional forces to a point where the teat cup drops downwardly on a teat from the original milking position, and even drops off a teat in some cases, before milking is completed.

Animals teats tend to assume the shape of the interior of the suction sleeve during milking. A suction sleeve having a triangular cross section provides more surface area contact with a teat than a circular one and thereby reduces slippage. However, the flat walls of triangular suction sleeves tend to collapse faster to a closed position in response to the pulsator opening the shell chamber to atmospheric pressure and return more slowly to a normally open position in response to the pulsator connecting the shell chamber to a vacuum, resulting in less of the total time interval of a pulsation cycle being available for milking.

French Patent No. 499,796 discloses configuring the interior of the shell so that, during the milking cycle, portions of the suction sleeve are in close contact with the shell interior and can not expand or bulge while other portions are spaced inwardly from the shell interior and can expand or bulge to a limited degree. FIG. 3 of the patent discloses a generally triangular shell having undulating sides and arranged to prevent expansion or bulging of portions of the suction sleeve adjacent the side walls. Only portions of the suction sleeve in the vicinity of the three corners of the triangle can expand or bulge.

SUMMARY OF THE INVENTION

One of the objects of the invention is to provide a resilient milking inflation including a suction sleeve having a generally triangular internal cross section and arranged to minimize slippage of a teat cup on an animal's teat during milking.

Another object of the invention is to provide such an inflation in which the suction sleeve, as compared to a triangular suction sleeve having flat side walls, is capable of moving from a closed position to an open position at a higher rate.

A further object of the invention is to provide such an inflation in which, as compared to a triangular suction sleeve having flat side walls, is capable from moving from an open position to a closed position at a slower rate.

A still further object of the invention is to provide such an inflation in which the suction sleeve is arranged to provide a substantially balanced closing action on an animal's teat.

A yet further object of the invention is to provide such an inflation in which the suction sleeve is capable of undergoing extended close/open cycles without structural failures.

The milking inflation provided by the invention is made from an elastomeric material, such as a rubber composition, is adapted for installation on a teat cup shell and has an elongated, generally tubular suction sleeve located inside the shell for receiving an animal's teat and cooperating with the shell to define a pressure chamber therebetween. The suction sleeve has three axially extending side walls connected together to form a generally triangular cross section. The side walls have a convex cross section and bulge slightly outward such that, when the inflation is installed on a shell and they are in a full open position, a built-in spring effect is induced into each side wall to bias them toward the full open position. The biasing force of this built-in spring effect must be overcome before the side walls can be moved inwardly toward a closed position in response to the shell chamber being exposed to atmospheric pressure and assists movement of the side walls toward an open position in response to exposing the shell chamber to a subatmospheric pressure.

The accelerated movement toward an open or outwardly bulged position increases the total milking time interval per each pulsation cycle.

The side walls preferably have a substantially flat inside surface to enhance surface contact with a teat. The side walls preferably are interconnected with axially extending ribs or corners which serve as anchors and remain in a substantially fixed position during close/open movement of the side walls. The moving portions of the side wall preferably are thinner than the anchors to enhance flexing between the open and close positions.

DESCRIPTION OF THE PREFERRED EMBODIMENTS

While a one-piece inflation is illustrated and described below, it should be understood that the invention can be adapted for multiple-piece inflations.

Figure 1:
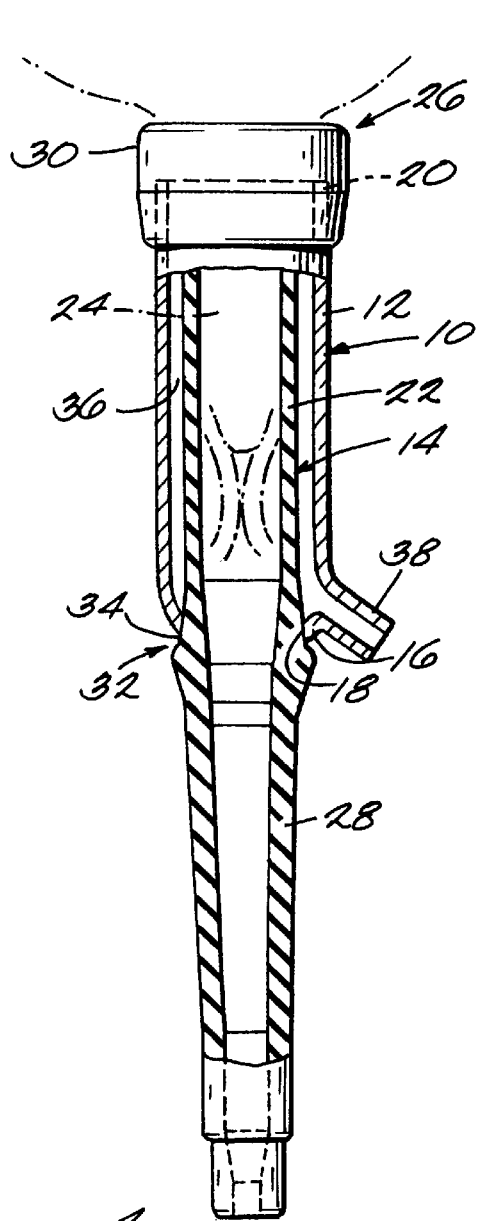
FIG. 1 is a broken away, partially sectioned, elevational view of a teat cup assembly including a milking inflation of the invention.
Figure 2:
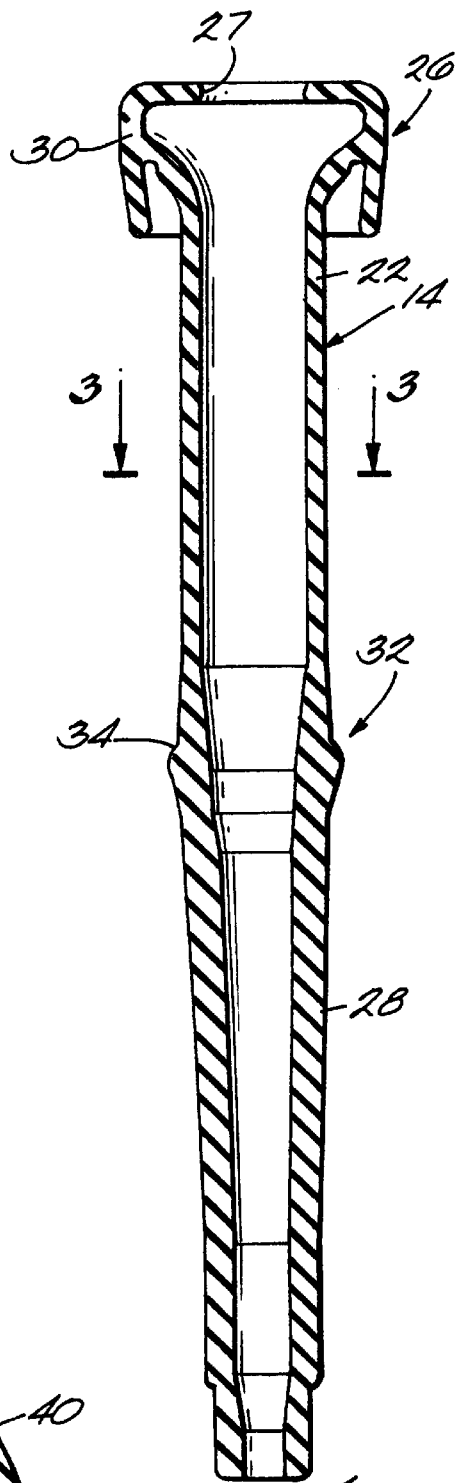
FIG. 2 is an enlarged, sectioned, elevational view of the milking inflation.

Illustrated in FIG. 1 is a teat cup assembly 10 including a rigid, generally cylindrical outer shell 12 which surrounds and supports a liner or inflation 14. The shell 12 is connected to a milker claw (not shown). The milker claw is connected to a suitable vacuum system in the usual manner and has a plurality of nipples (not shown) which project upwardly and outwardly from the milker claw.

The shell 12 can be formed from a metal, such as stainless steel, or a non-metallic material, such as a synthetic thermoplastic or thermosetting material. The shell 12 has a lower end 16 including an opening 18 of reduced diameter and an open upper end terminating in a rim 20.

The inflation 14 is a tubular member molded from a resilient or elastomeric material, preferably a synthetic or natural rubber composition including curing agents and the like. The inflation 14 has an elongated, tubular upper portion or suction sleeve 22 which fits inside the shell 12 and receives an animal's teat 24, a head end portion 26 which fits over the upper end of the shell 12 and has an opening 27 through which a teat extends and an elongated, generally cylindrical milking tube section 28 of reduced diameter which extends from the lower end of the shell 12 and is slipped onto a milker claw nipple.

The head end portion 26 of the inflation has a peripheral, downwardly extending cuff 30 which surrounds and fits snugly over the upper end of the shell 12 and sealingly engages the rim 20 as shown in FIG. 1. An enlarged portion 32 is provided between the suction sleeve 22 and the milking tube section 28. This enlarged portion 32 is squeezed through the opening 18 in the lower end 16 of the shell 12 by pulling on the milking tube section 28 after the cuff 30 is fitted into place over the shell rim 20. The enlarged portion 32 includes a flange 34 which surrounds the opening 18 in the lower end of the shell 12 and forms a seal with the shell 12 after the milking tube section 28 is released. A sealed chamber 36 is defined between the interior wall of the shell 12 and the suction sleeve 22.

Located on the side of the shell 12 is a nipple 38 connected via suitable tubing (not shown) in communication with a pulsator (not shown) which alternately opens the chamber 36 to atmospheric pressure and connects the chamber 36 to a vacuum. A vacuum is maintained in the milker claw and, thus, inside the inflation 14 after installation on a teat. This causes the teat orifice to dilate and milk flows from the teat 24 through the suction sleeve 22 and through the milking tube section 28 into the milker claw. The suction sleeve 22 collapses to a closed position as shown by dashed lines in FIG. 1 to interrupt milk flow, in response to the pulsator opening the shell chamber 36 to atmospheric pressure, as a result of the differential pressure inside the suction sleeve 22 and the shell chamber 36. The suction sleeve 22 returns to a normally open position illustrated by solid lines in FIG. 1 to permit resumption of milk flow in response to the pulsator connecting the shell chamber 36 to a vacuum.

Figure 3:
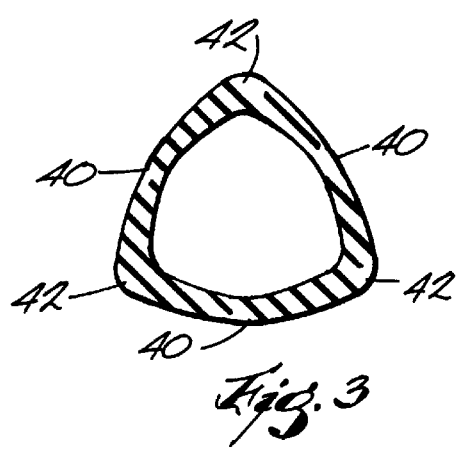
FIG. 3 is an enlarged sectional view taken generally along line 3—3 in FIG. 2.

The suction sleeve 22 has a generally triangular cross section as illustrated in FIG. 3 and includes three side walls 40 extending axially substantially the full length of the suction sleeve 22. The side walls 40 are interconnected by axially extending ribs or anchors 42.

It has been found that, if the side walls are substantially flat, the axial tension applied on the side walls after the inflation 14 is installed in the shell 12, by pulling the milking tube section 28 through the opening 18 to snap the enlarged portion 32 into place as described above, induces internal material stresses which cause the side walls to buckle inwardly toward a closed position. Consequently, flat side walls tend to readily collapse to a fully closed position in response to the pulsator opening the shell chamber 36 to atmospheric pressure. Conversely, flat side walls under installed tension are much slower to return to a fully open position in response to the pulsator connecting the shell chamber 36 to vacuum. That is, prior to returning to a fully open position, the bias toward a closed position caused by the inwardly buckled side walls must be overcome before they start moving outwardly toward an open position. Generally, flat side walls do not return to a fully open position and, instead, return to a starting position where they are buckled inwardly.

In accordance with the invention, this undesirable close/open action is addressed by making the side walls 40 convex as shown in FIG. 3. With such an arrangement, the side walls 40 remain in a convex orientation (i.e., are bulged outwardly) even after axial tension is applied during installation of the inflation 14 into a shell 12. A built-in spring effect induced into each side wall 40 biases them toward an open position, instead of toward a closed position as is the case with flat side walls as described above. When the side walls 40 start to collapse toward a closed position in response to the pulsator opening the shell chamber 36 to atmosphere, the bias of the built-in spring must be overcome before the side walls 40 start moving toward a closed position. On the other hand, as the side walls 40 start to move from a closed position toward an open position in response to the pulsator connecting the shell chamber 36 to a vacuum, the built-in spring effect accelerates movement toward the open position. Also, the built-in spring effect returns the side walls 40 to a full open position (i.e., the side walls 40 are outwardly bulged to their original position). Consequently, the total milking time interval per a pulsation cycle is longer than would be the case with flat side walls and milking proceeds faster.

The side walls 40 apply a collapsing force on the teat tissue from three equally spaced directions, thereby providing a substantially balanced closing action and a more gentle teat massaging effect than is the case with suction tubes having a circular inside configuration. Also, the surface area contact between a teat and the side walls 40 when in a fully open position is greater than the suction tubes having a circular cross section because the teat assumes a somewhat triangular shape during milking. This increases surface friction forces between the inflation and a teat, thus reducing the tendency for the teat cup assembly to slip downwardly on a teat during milking. The inside surfaces of the side walls preferably are substantially flat to enhance the surface contact with a teat.

The ribs or anchors 42 preferably are arranged to remain in a substantially fixed position during the close/open movement of the side walls 40. This means that only the side walls 40 move between closed and open positions, instead of substantially the entire suction tube as is the case with those having a circular cross section, thereby insuring a more stable operation of the suction tube during milking.

The degree of outward bulge and/or wall thickness of the side walls to provide the desired built-in spring effect is not particularly critical as long as all the side walls move inward and outward between the closed and open positions at substantially the same rate, and the built-in spring effect is not excessive (i.e., the biasing force is not so great that the differential pressure across the side walls 40 when the shell chamber 36 is opened to atmospheric pressure is insufficient to collapse the side walls 40 to a closed position). These factors vary depending on the composition of the inflation material, inside dimensions of the suction sleeve, etc., and can be determined by routine experimentation.

While the thickness of the side walls 40 and the anchors 42 can be substantially the same, the thickness of the side walls 40 preferably is somewhat less than that for the anchors 42 in order to encourage inward flexing during closing. As a guide, the thickness of the side walls 40 can be from about 0.08 to about 0.10 inch and the thickness of the anchors 42 can be from about 0.125 to about 0.20 inch. While the thickness of the side walls 40 between the anchors 42 preferably is substantially uniform, it does not have to be uniform.

Since only the side walls 40 are flexed during movement between the closed and open positions, lower stresses are imposed on the elastomeric material, resulting in the capability of withstanding extended close/open cycles without a structural failure.

From the foregoing description, one skilled in the art can easily ascertain the essential characteristics of the inventions and, without departing from the spirit and scope thereof, make various changes and modifications to adapt it to various uses.

What is claimed is:

1. A milking inflation for a teat cup assembly including a rigid shell, said inflation being made from an elastomeric material, having an elongated, generally tubular suction sleeve located inside the shell and defining an elongated interior chamber for receiving an animal's teat and cooperating with the shell to define a pressure chamber therebetween and an elongated milking tube extending from the shell for connection with an automatic milking machine claw under subatmospheric pressure and adapted to collapse inwardly along a longitudinal axis from an open position, when the pressure differential between the interior chamber and the pressure chamber is substantially equal, to a closed position, when the pressure in the pressure chamber is greater than the pressure in the interior chamber, said suction sleeve having, in the open condition, a generally triangular cross-sectional shape defined by triangular interior and exterior surfaces formed by three axially extending, interconnected side walls; and said side walls having a convex cross sectional configuration and bulging slightly outwardly;

whereby, when said inflation is installed on a shell and said side walls are in the open position, each of said side walls is biased toward the open position and the bias must be overcome before said side walls can be moved inwardly toward the closed position in response to atmospheric pressure in the shell chamber and the bias assists in movement of said side walls toward the open position in response to a subatmospheric pressure in the shell chamber.

2. A milking inflation according to claim 1 wherein said side walls are interconnected by axially extending ribs having a thickness greater than the thickness of said side walls.

3. A milking inflation according to claim 2 wherein said ribs remain in a substantially fixed position during movement of said side walls between the open and closed positions.

4. A milking inflation according to claim 3 wherein each of said side walls has a generally flat inside surface.

5. A milking inflation according to claim 4 wherein the portions of said side walls which move between the open and closed position have a substantially uniform thickness.

6. A milking inflation for a teat cup assembly including a rigid shell, said inflation being made from an elastomeric material, having an elongated, generally tubular suction sleeve located inside the shell and defining an elongated interior chamber for receiving an animal's teat and cooperating with the shell to define a pressure chamber therebetween and an elongated milking tube extending from the shell for connection with an automatic milking machine claw under subatmospheric pressure and adapted to collapse inwardly along a longitudinal axis from an open position, when the pressure differential between the interior chamber and the pressure chamber is substantially equal, to a closed position, when the pressure in the pressure chamber is greater than the pressure in the interior chamber, said suction sleeve having, in the open condition, a generally triangular cross sectional shape defined by triangular interior and exterior surfaces formed by three axially extending side walls having a generally flat inside surface and connected together by axially extending ribs; and said side walls having a convex cross sectional configuration and bulging slightly outwardly;

whereby, when said inflation is installed on a shell and said side walls are in the open position, each of said side walls is biased toward the open position and the side wall bias must be overcome before said side walls can be moved inwardly toward the closed position in response to atmospheric pressure in the shell chamber and the side wall bias assists in movement of said side walls toward the open position in response to a subatmospheric pressure in the shell chamber; and wherein said ribs remain in a substantially fixed position while said side walls move between the open and closed positions.

7. A milking inflation according to claim 6 wherein said ribs have a thickness greater than the thickness of said side walls.

8. A milking inflation according to claim 7 wherein the portions of said side walls which move between the open and closed positions have a substantially uniform thickness.

* * * * *